(12) United States Patent
Yoshii et al.

(10) Patent No.: US 7,304,831 B2
(45) Date of Patent: Dec. 4, 2007

(54) CERAMIC ELECTRONIC COMPONENT AND MULTILAYER CAPACITOR

(75) Inventors: Akitoshi Yoshii, Yurihonjou (JP); Taisuke Ahiko, Nikaho (JP); Atsushi Takeda, Nikaho (JP); Shirou Ootsuki, Nikaho (JP); Shinya Onodera, Nikaho (JP); Miki Kimura, Nikaho (JP); Hiromi Kikuchi, Nikaho (JP)

(73) Assignee: TDK Corporation, Tokyo (JP)

( * ) Notice: Subject to any disclaimer, the term of this patent is extended or adjusted under 35 U.S.C. 154(b) by 160 days.

(21) Appl. No.: 11/347,296

(22) Filed: Feb. 6, 2006

(65) Prior Publication Data

US 2006/0187613 A1    Aug. 24, 2006

(30) Foreign Application Priority Data

Feb. 18, 2005    (JP)    ............... P2005-042940

(51) Int. Cl.
    *H01G 4/06*    (2006.01)
(52) U.S. Cl. ............... 361/321.2; 361/321.1; 361/311; 361/313; 361/306.1; 361/306.3
(58) Field of Classification Search ............. 361/321.2, 361/321.1, 321.4, 321.5, 302–305, 311–313, 361/306.1, 306.2, 306.3, 328–329; 29/25.41, 29/25.42
See application file for complete search history.

(56) References Cited

U.S. PATENT DOCUMENTS

| | | | |
|---|---|---|---|
| 5,835,339 A * | 11/1998 | Sakamoto et al. ....... | 361/321.2 |
| 6,090,435 A | 7/2000 | Ueno et al. | |
| 6,181,543 B1 * | 1/2001 | Kobayashi et al. ...... | 361/301.3 |
| 6,381,117 B1 * | 4/2002 | Nakagawa et al. ...... | 361/306.3 |
| 6,542,352 B1 * | 4/2003 | Devoe et al. ............ | 361/321.2 |
| 6,879,481 B2 * | 4/2005 | Honda et al. ............... | 361/311 |
| 6,903,919 B2 * | 6/2005 | Kayatani et al. .......... | 361/321.2 |

FOREIGN PATENT DOCUMENTS

| | | |
|---|---|---|
| JP | A-08-107039 | 4/1996 |
| JP | A-08-203771 | 8/1996 |
| JP | A-10-284343 | 10/1998 |
| JP | A-11-162771 | 6/1999 |
| JP | 2003-318059 | 11/2003 |

* cited by examiner

*Primary Examiner*—Nguyen T. Ha
(74) *Attorney, Agent, or Firm*—Oliff & Berridge, PLC

(57) ABSTRACT

A multilayer capacitor comprises a ceramic sintered body, an internal electrode disposed in the ceramic sintered body, and an external electrode disposed on an external surface of the ceramic sintered body. The external electrode has a first electrode layer formed on the external surface of the ceramic sintered body, a second electrode layer formed on the first electrode layer, and a conductive resin layer formed on the second electrode layer. The internal electrode and the first electrode layer consist primarily of a base metal. The second electrode layer consists primarily of a noble metal or a noble metal alloy. The conductive resin layer contains a noble metal or a noble metal alloy as a conductive material.

10 Claims, 1 Drawing Sheet

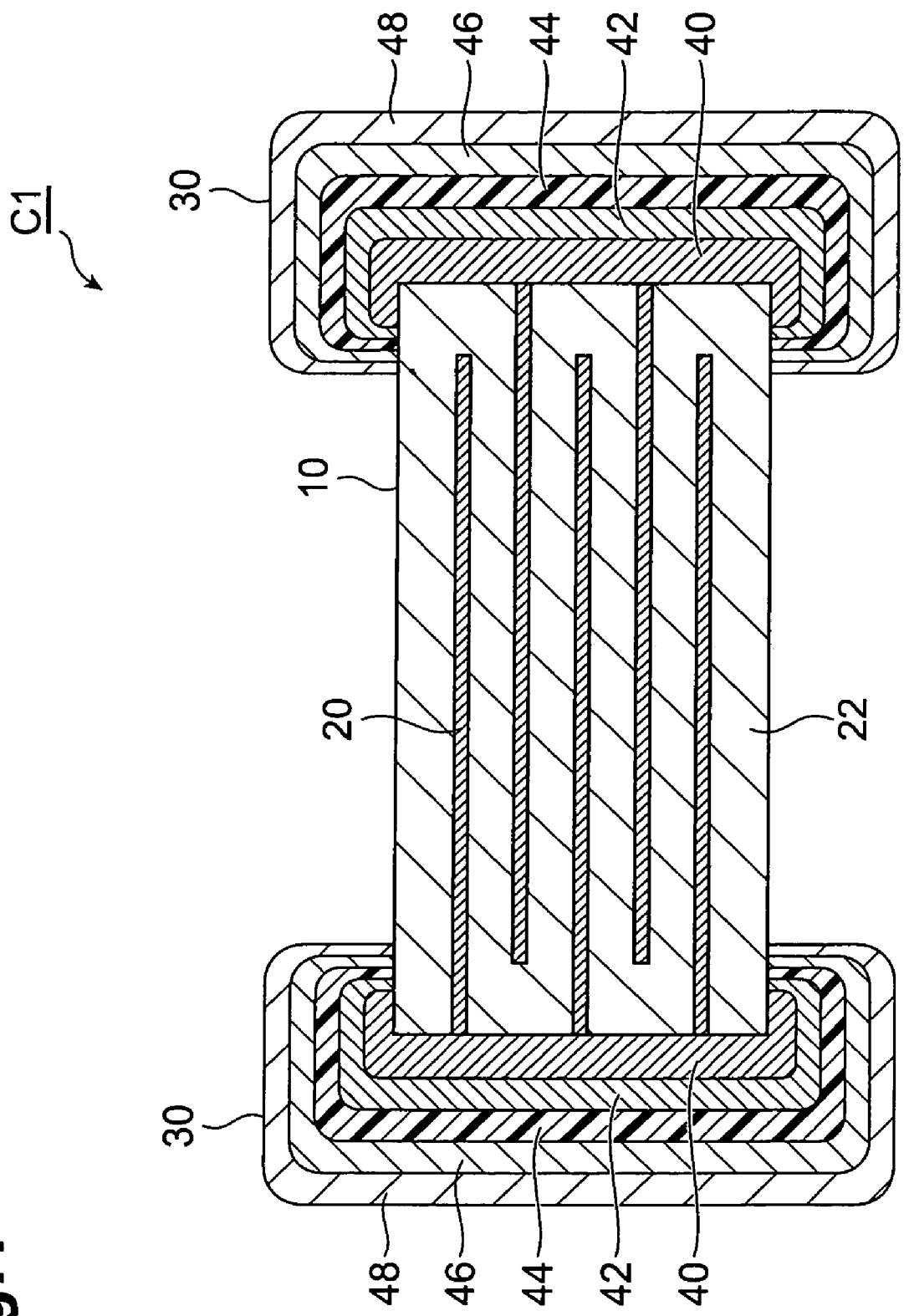

CERAMIC ELECTRONIC COMPONENT AND MULTILAYER CAPACITOR

BACKGROUND OF THE INVENTION

1. Field of the Invention

The present invention relates to a ceramic electronic component and a multilayer capacitor.

2. Related Background Art

Examples of the known ceramic electronic components of this type include those having external electrodes with a resin layer (e.g., Patent Documents 1-4).

A ceramic electronic component of this type is mounted on a substrate by soldering the external electrodes to the substrate in general. When the substrate with the ceramic electronic component thereon is subjected to a thermal shock due to a sudden temperature change, the ceramic electronic component and substrate expand and contract according to their respective coefficients of thermal expansion. On that occasion, the ceramic electronic component and the substrate have different amounts of expansion and contraction due to the difference between the coefficients of thermal expansion, so as to cause deflection. This deflection could result in a crack in the ceramic electronic component and a malfunction thereof. Therefore, the ceramic electronic components described in Patent Documents 1-4 are arranged to absorb the deflection by the resin layer of the external electrodes and thereby prevent the occurrence of a crack due to the thermal shock.

[Patent Document 1] Japanese Patent Application Laid-Open No. 11-162771

[Patent Document 2] Japanese Patent Application Laid-Open No. 8-107039

[Patent Document 3] Japanese Patent Application Laid-Open No. 10-284343

[Patent Document 4] Japanese Patent Application Laid-Open No. 8-203771

SUMMARY OF THE INVENTION

In the external electrodes of the ceramic electronic component disclosed in Patent Document 1, an electrode layer formed on a ceramic sintered body and connected directly to internal electrodes is made of Ag or an Ag alloy. Ag and an Ag alloy are unlikely to alloy with the base metals such as Ni, and have a weak bonding force to the base metals. Therefore, in cases where the internal electrodes are made of a base metal such as Ni in order to reduce cost, mechanical strength is not enough between the external electrodes and the ceramic sintered body, so that the external electrodes could peel off the ceramic sintered body.

In the external electrodes of the ceramic electronic component disclosed in Patent Document 2, an electrode layer of a base metal such as Ni, Cu, Sn, or Sn—Pb is formed immediately below the resin layer. For this reason, if the resin layer absorbs water, the surface of the electrode layer of the base metal immediately below the resin layer will oxidize, so as to increase the electric resistance of the ceramic electronic component.

In the external electrodes of the ceramic electronic components disclosed in Patent Documents 3 and 4, there is only one electrode layer below the resin layer and this electrode layer is connected to the internal electrodes. For this reason, where the internal electrodes are made of a base metal, a problem will arise in either of cases where the electrode layer below the resin layer is a layer of a base metal or a layer of a noble metal. Namely, bonding to the internal electrodes will be too weak where the electrode layer below the resin layer is made of a noble metal; the electric resistance of the ceramic electronic component will increase because of absorption of water in the resin layer where the electrode layer is made of a base metal.

The present invention has been accomplished in order to solve the above problems and an object of the invention is to provide a ceramic electronic component and a multilayer capacitor capable of realizing reduction of cost, preventing the occurrence of a crack due to thermal shock, and suppressing the increase of electric resistance.

A ceramic electronic component according to the present invention comprises a ceramic sintered body, an internal electrode disposed in the ceramic sintered body, and an external electrode disposed on an external surface of the ceramic sintered body, wherein the internal electrode consists primarily of a base metal, and wherein the external electrode has a first electrode layer consisting primarily of a base metal and formed on the external surface of the ceramic sintered body, a second electrode layer consisting primarily of a noble metal or a noble metal alloy and formed on the first electrode layer, and a conductive resin layer containing a noble metal or a noble metal alloy as a conductive material and formed on the second electrode layer.

The ceramic electronic component according to the present invention substantializes the reduction of cost, the prevention of occurrence of crack due to the thermal shock, and the suppression of increase in the electric resistance by the configuration wherein the internal electrode consists primarily of the base metal and wherein the external electrode has the first electrode layer, the second electrode layer, and the conductive resin layer containing their respective components described above. Specifically, when the internal electrode consists primarily of the base metal, it becomes feasible to realize the reduction of cost of the ceramic electronic component. When the first electrode layer consists primarily of the base metal, it becomes feasible to enhance the bonding to the internal electrode and to assure sufficient mechanical strength between the ceramic sintered body and the external electrode. When the second electrode layer consists primarily of the noble metal or the noble metal alloy and is formed between the first electrode layer and the conductive resin layer containing the noble metal, it is feasible to prevent the second electrode layer from oxidizing because of absorption of water in the conductive resin layer and thereby increasing the resistance of the ceramic electronic component. When the conductive resin layer contains the noble metal or the noble metal alloy and is formed on the second electrode layer, it is feasible to enhance the bonding between the second electrode layer and the conductive resin layer. Since the conductive resin layer absorbs the deflection caused between the ceramic electronic component and a substrate or the like due to the thermal shock, it becomes feasible to prevent the ceramic electronic component from cracking.

Preferably, the base metal which the internal electrode consists primarily of is Ni or Cu, the base metal which the first electrode layer consists primarily of is Cu, the noble metal or the noble metal alloy which the second electrode layer consists primarily of is Ag, Au, an Ag—Pd alloy, or an Ag—Au alloy, and the noble metal or the noble metal alloy which the conductive resin layer contains as the conductive material is Ag, Au, an Ag—Pd alloy, or an Ag—Au alloy.

Preferably, the first electrode layer is formed by applying and baking a conductive paste containing the base metal which the first electrode layer consists primarily of. In this case, the metal in the internal electrode is alloyed with the metal in the first electrode layer by the thermal treatment of baking to form a region of the alloy between the internal electrode and the first electrode layer. For this reason, it becomes feasible to further enhance the bonding between the internal electrode and the first electrode layer.

Preferably, the second electrode layer is formed by applying and baking a conductive paste containing the noble metal or the noble metal alloy which the second electrode layer consists primarily of. In this case, the metal in the first electrode layer is alloyed with the metal in the second electrode layer by the thermal treatment of baking to form a region of the alloy between the first electrode layer and the second electrode layer. For this reason, it becomes feasible to enhance the bonding between the first electrode layer and the second electrode layer. In addition, since the region of the alloy is formed between the first electrode layer and the second electrode layer, the first electrode layer becomes less likely to oxidize. As a result, it becomes feasible to further suppress the increase in the electric resistance of the ceramic electronic component.

Preferably, the external electrode further has a third electrode layer consisting primarily of Ni and formed on the conductive resin layer, and a fourth electrode layer consisting primarily of Sn or an Sn alloy and formed on the third electrode layer. In this case, the external electrode has the third electrode layer consisting primarily of Ni which is resistant to solder leaching or erosion, and it is thus feasible to prevent occurrence of solder leaching in the external electrode. When the external electrode further has the fourth electrode layer consisting primarily of Sn or the Sn alloy with excellent solderability, it becomes easier to mount the ceramic electronic component on a substrate or the like.

A multilayer capacitor according to the present invention comprises a multilayer body in which dielectric layers and internal electrodes are alternately laminated, and an external electrode disposed on an external surface of the multilayer body, wherein the internal electrodes consist primarily of a base metal, and wherein the external electrode has a first electrode layer consisting primarily of a base metal and formed on the external surface of the multilayer body, a second electrode layer consisting primarily of a noble metal or a noble metal alloy and formed on the first electrode layer, and a conductive resin layer containing a noble metal or a noble metal alloy as a conductive material and formed on the second electrode layer.

The multilayer capacitor according to the present invention substantializes the reduction of cost, the prevention of occurrence of crack due to the thermal shock, and the suppression of the increase in the electric resistance by the configuration wherein the internal electrodes consist primarily of the base metal and wherein the external electrode has the first electrode layer, the second electrode layer, and the conductive resin layer containing their respective components described above. Specifically, when the internal electrodes consist primarily of the base metal, it becomes feasible to realize the reduction of cost of the multilayer capacitor. When the first electrode layer consists primarily of the base metal, it becomes feasible to enhance the bonding to the internal electrodes and to assure sufficient mechanical strength between the multilayer body and the external electrode. When the second electrode layer consists primarily of the noble metal or the noble metal alloy and is formed between the first electrode layer and the conductive resin layer containing the noble metal, it is feasible to prevent the second electrode layer from oxidizing because of absorption of water in the conductive resin layer and thereby increasing the resistance of the multilayer capacitor. When the conductive resin layer contains the noble metal or the noble metal alloy and is formed on the second electrode layer, it is feasible to enhance the bonding between the second electrode layer and the conductive resin layer. Since the conductive resin layer absorbs the deflection caused between the multilayer capacitor and a substrate or the like due to a thermal shock, it is feasible to prevent the multilayer capacitor from cracking.

The present invention successfully provides the ceramic electronic component and multilayer capacitor capable of realizing the reduction of cost, preventing the occurrence of the crack due to the thermal shock, and suppressing the increase in the electric resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

FIG. 1 is a sectional view of a multilayer capacitor according to an embodiment.

DESCRIPTION OF THE PREFERRED EMBODIMENTS

A preferred embodiment of the present invention will be described below in detail with reference to the accompanying drawing. In the description, identical elements or elements with identical functionality will be denoted by the same reference symbols, without redundant description.

FIG. 1 is a sectional view of a multilayer capacitor C1 according to an embodiment. The multilayer capacitor C1 has a ceramic sintered body 10, and two external electrodes 30, as shown in FIG. 1.

In the ceramic sintered body 10, internal electrodes 20 are laminated with dielectric layers 22 in between. The ceramic sintered body 10 is a multilayer body in which the dielectric layers 22 and internal electrodes 20 are alternately laminated. In the actual multilayer capacitor C1, the dielectric layers 22 are integrally formed so that no boundary is visually recognized between dielectric layers 22. The internal electrodes 20 disposed in the ceramic sintered body 10 are alternately drawn out to two opposed side faces of ceramic sintered body 10 parallel to the laminating direction of the internal electrodes 20. The internal electrodes 20 consist primarily of Ni which is a base metal.

Each of the external electrodes 30 is disposed on an external surface of the ceramic sintered body 10. Each external electrode 30 has a first electrode layer 40, a second electrode layer 42, a conductive resin layer 44, a third electrode layer 46, and a fourth electrode layer 48.

The first electrode layer 40 consists primarily of Cu which is a base metal. The first electrode layer 40 is formed on the external surface of ceramic sintered body 10, i.e., on one of the two opposed side faces of the ceramic sintered body 10 parallel to the laminating direction of the internal electrodes 20. The first electrode layer 40 is connected directly to the internal electrodes 20. This results in electrically and mechanically connecting the first electrode layer 40 to the internal electrodes 20. The first electrode layer 40 is formed by applying a conductive paste containing Cu, onto the external surface of the ceramic sintered body 10 and baking it.

The second electrode layer 42 consists primarily of an Ag—Pd alloy which is a noble metal alloy. The second electrode layer 42 is formed on the first electrode layer 40 so as to cover the first electrode layer 40. The second electrode layer 42 is formed by applying a conductive paste containing the Ag—Pd alloy, onto the first electrode layer 40 and baking it.

The conductive resin layer 44 contains Ag being a noble metal, as a conductive material. The conductive resin layer 44 is formed on the second electrode layer 42 so as to cover the second electrode layer 42. The conductive resin layer 44 is formed by applying a resin material containing powder of Ag, onto the second electrode layer 42 and curing it. The resin material can be, for example, a phenol resin, an acrylic resin, a silicone resin, or the like.

The third electrode layer 46 consists primarily of Ni. The third electrode layer 46 is formed on the conductive resin layer 44 so as to cover the conductive resin layer 44. The third electrode layer 46 is formed by plating the surface of the conductive resin layer 44 with Ni.

The fourth electrode layer 48 consists primarily of Sn or an Sn alloy. The fourth electrode layer 48 is formed on the third electrode layer 46 so as to cover the third electrode layer 46. The fourth electrode layer 48 is formed by plating the surface of the third electrode layer 46 with Sn or the Sn alloy.

In the multilayer capacitor C1, the internal electrodes 20 consist primarily of Ni being the base metal, while each of the external electrodes 30 has the first electrode layer 40 consisting primarily of Cu being the base metal, the second electrode layer 42 consisting primarily of the Ag—Pd alloy being the noble metal alloy, and the conductive resin layer 44 containing Ag being the noble metal, in the order named. Since the internal electrodes 20 and the layers contain the above-described components and the external electrodes 30 are formed in the above-stated order, the external electrodes 30 of the multilayer capacitor C1 have the effects to be presented by the respective layers. As a result, the multilayer capacitor C1 substantializes the reduction of cost, the prevention of occurrence of crack due to the thermal shock, and the suppression of increase in electric resistance.

The effects presented by the respective layers will be specifically described below.

The internal electrodes 20 of the multilayer capacitor C1 consist primarily of Ni. Since Ni is the base metal, it becomes feasible to reduce cost, when compared with the case where the internal electrodes consist primarily of a noble metal.

The first electrode layer 40 connected directly to the internal electrodes 20 consists primarily of Cu which is the base metal. For this reason, the first electrode layer 40 becomes bonded stronger to the internal electrodes 20 consisting primarily of Ni being the base metal. As a result, it becomes feasible to assure sufficient mechanical strength between the ceramic sintered body 10 and the external electrodes 30.

The second electrode layer 42 formed between the first electrode layer 40 and the conductive resin layer 44 containing the noble metal, consists primarily of the Ag—Pd alloy which is the noble metal alloy. For this reason, even if the conductive resin layer 44 contains water, the second electrode layer 42 will not oxidize, so as to prevent the increase in the electric resistance, or equivalent series resistance (ESR) of the multilayer capacitor C1.

The conductive resin layer 44 formed on the second electrode layer 42 contains Ag, or the noble metal. Since the second electrode layer 42 contains the noble metal alloy (Ag—Pd alloy), bonding becomes strong between the second electrode layer 42 and the conductive resin layer 44.

The conductive resin layer 44 is made of the resin material. For this reason, when the multilayer capacitor C1, in a state in which it is mounted on a substrate, is subjected to a thermal shock, the conductive resin layer 44 absorbs deflection between the substrate and the multilayer capacitor C1. This relieves external force exerted on the multilayer capacitor C1, so as to prevent the multilayer capacitor C1 from cracking.

The first electrode layer 40 is formed by applying the conductive paste containing Cu, onto the ceramic sintered body 10 and baking it. For this reason, Ni in the internal electrodes 20 is alloyed with Cu in the first electrode layer 40 by the thermal treatment of baking, so as to form a region of the alloy between the internal electrodes 20 and the first electrode layer 40. As a result, it becomes feasible to enhance the bonding between the internal electrodes 20 and the first electrode layer 40.

The second electrode layer 42 is formed by applying the conductive paste containing the Ag—Pd alloy, onto the first electrode layer 40 and baking it. For this reason, Cu in the first electrode layer 40 is alloyed with the Ag—Pd alloy in the second electrode layer 42 by the thermal treatment of baking, so as to form a region of the alloy between the first electrode layer 40 and the second electrode layer 42. As a result, it becomes feasible to enhance the bonding between the first electrode layer 40 and the second electrode layer 42.

Since the foregoing region of the alloy is formed between the first electrode layer 40 and the second electrode layer 42, the electric potential gently varies between the first electrode layer 40 and the second electrode layer 42. As a result, the first electrode layer 40 becomes less likely to oxidize, and it becomes feasible to further suppress the increase in the electric resistance of the multilayer capacitor C1.

The external electrode 30 has the third electrode layer 46. The third electrode layer 46 consists primarily of Ni. Since Ni is resistant to solder leaching, it is feasible to prevent a partial loss in the external electrode 30 due to the solder leaching.

The external electrode 30 has the fourth electrode layer 48 on the third electrode layer 46. The fourth electrode layer 48 consists primarily of Sn or the Sn alloy. Since Sn or the Sn alloy has excellent solderability, it becomes easier to mount the multilayer capacitor C1 on a substrate or the like.

The preferred embodiment of the present invention was described above in detail, but it is noted that the present invention is by no means intended to be limited to the above embodiment. For example, the internal electrodes 20 may consist primarily of a base metal other than Ni (e.g., Cu or the like). The first electrode layer 40 may consist primarily of a base metal other than Cu. The second electrode layer 42 may consist primarily of a noble metal alloy other than the Ag—Pd alloy (e.g., an Ag—Au alloy or the like), or a noble metal (e.g., Ag or Au). The conductive resin layer 44 may contain a noble metal other than Ag (e.g., Au or the like), or a noble metal alloy (e.g., an Ag—Pd alloy or an Ag—Au alloy).

The present embodiment showed the example in which the present invention was applied to the multilayer capacitor, but the present invention is not limited to this example. The present invention is also applicable, for example, to piezoelectric elements (piezoelectric actuators), inductors, varistors, thermistors, and so on.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A ceramic electronic component comprising:
    a ceramic sintered body;
    an internal electrode disposed in the ceramic sintered body; and
    an external electrode disposed on an external surface of the ceramic sintered body,
    wherein the internal electrode consists primarily of a base metal,
    wherein the external electrode has:
    a first electrode layer consisting primarily of a base metal and formed on the external surface of the ceramic sintered body;
    a second electrode layer consisting primarily of a noble metal or a noble metal alloy and formed on the first electrode layer; and
    a conductive resin layer containing a noble metal or a noble metal alloy as a conductive material and formed on the second electrode layer.

2. The ceramic electronic component according to claim 1,
    wherein the base metal which the internal electrode consists primarily of is Ni or Cu,
    wherein the base metal which the first electrode layer consists primarily of is Cu,
    wherein the noble metal or the noble metal alloy which the second electrode layer consists primarily of is Ag, Au, an Ag—Pd alloy, or an Ag—Au alloy, and
    wherein the noble metal or the noble metal alloy which the conductive resin layer contains as the conductive material is Ag, Au, an Ag—Pd alloy, or an Ag—Au alloy.

3. The ceramic electronic component according to claim 1, wherein the first electrode layer is formed by applying and baking a conductive paste containing the base metal which the first electrode layer consists primarily of.

4. The ceramic electronic component according to claim 1, wherein the second electrode layer is formed by applying and baking a conductive paste containing the noble metal or the noble metal alloy which the second electrode layer consists primarily of.

5. The ceramic electronic component according to claim 1, wherein the external electrode further has:
    a third electrode layer consisting primarily of Ni and formed on the conductive resin layer; and
    a fourth electrode layer consisting primarily of Sn or an Sn alloy and formed on the third electrode layer.

6. A multilayer capacitor comprising:
    a multilayer body in which dielectric layers and internal electrodes are alternately laminated; and
    an external electrode disposed on an external surface of the multilayer body,
    wherein the internal electrodes consist primarily of a base metal, and
    wherein the external electrode has:
    a first electrode layer consisting primarily of a base metal and formed on the external surface of the multilayer body;
    a second electrode layer consisting primarily of a noble metal or a noble metal alloy and formed on the first electrode layer; and
    a conductive resin layer containing a noble metal or a noble metal alloy as a conductive material and formed on the second electrode layer.

7. The multilayer capacitor according to claim 6,
    wherein the base metal which the internal electrodes consist primarily of is Ni or Cu,
    wherein the base metal which the first electrode layer consists primarily of is Cu,
    wherein the noble metal or the noble metal alloy which the second electrode layer consists primarily of is Ag, Au, an Ag—Pd alloy, or an Ag—Au alloy, and
    wherein the noble metal or the noble metal alloy which the conductive resin layer contains as the conductive material is Ag, Au, an Ag—Pd alloy, or an Ag—Au alloy.

8. The multilayer capacitor according to claim 6, wherein the first electrode layer is formed by applying and baking a conductive paste containing the base metal which the first electrode layer consists primarily of.

9. The multilayer capacitor according to claim 6, wherein the second electrode layer is formed by applying and baking a conductive paste containing the noble metal or the noble metal alloy which the second electrode layer consists primarily of.

10. The multilayer capacitor according to claim 6, wherein the external electrode further has:
    a third electrode layer consisting primarily of Ni and formed on the conductive resin layer; and
    a fourth electrode layer consisting primarily of Sn or an Sn alloy and formed on the third electrode layer.

* * * * *